Nov. 20, 1951   J. M. PESTARINI   2,575,637
DIRECT CURRENT POWER SYSTEM
Filed July 28, 1947

INVENTOR
Joseph M. Pestarini
BY
Philip S. Hilbert
ATTORNEY

Patented Nov. 20, 1951

2,575,637

UNITED STATES PATENT OFFICE 2,575,637

DIRECT-CURRENT POWER SYSTEM

Joseph Maximus Pestarini, New York, N. Y.

Application July 28, 1947, Serial No. 764,164

7 Claims. (Cl. 171—123)

1

This invention relates to direct current power systems.

An object of this invention is to provide an improved direct current power system for supplying direct current from a source to a consumer where the voltage and current requirements of the consumer are different from that of the source.

Another object of this invention is to provide a power system of the character described wherein the source has a practically constant voltage while the consumer requires a voltage varying from zero or a minimum negative value to a maximum positive value.

A further object of this invention is to provide in a power system of the character described, a pair of dynamo electric machines arranged for operation in conjunction with a regulator dynamo whereby the operation of the pair of machines is regulated so as supply various current voltage characteristics to a consumer and further, to provide a stable rotational speed for the pair of machines.

Figure 1:
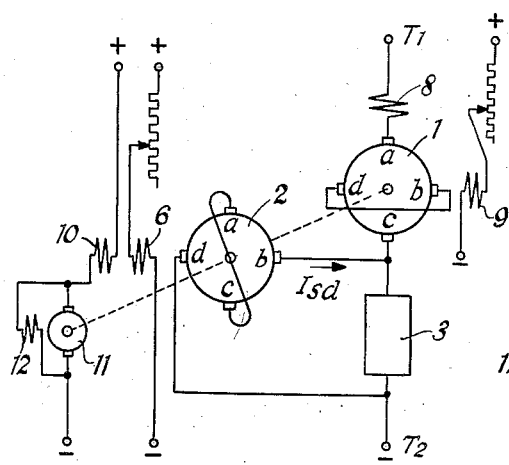
Figure 2:
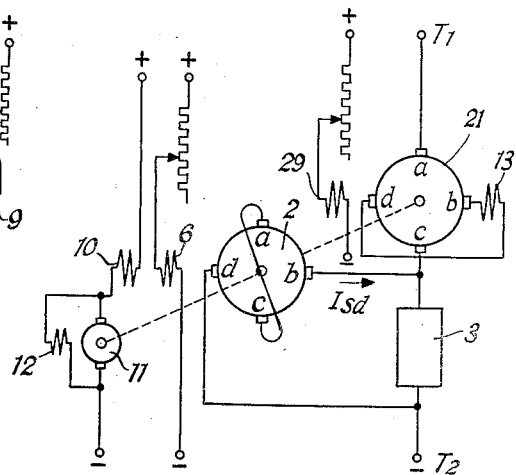
Figure 3:
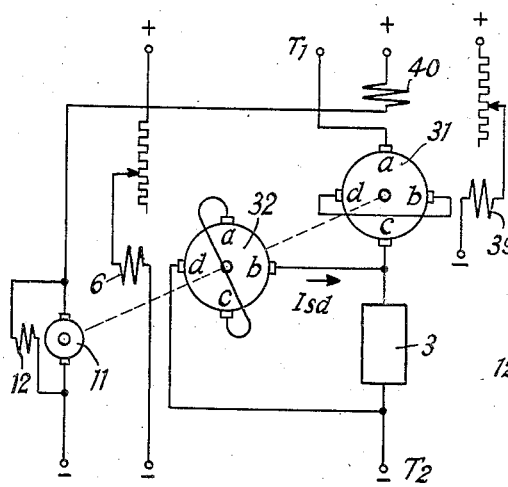
Figure 4:
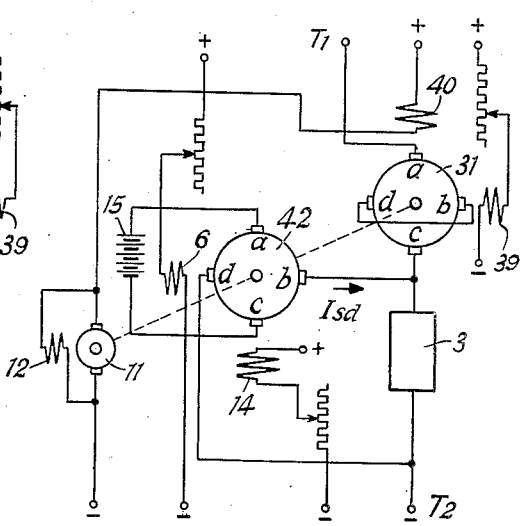

In the drawings, Fig. 1 shows an arrangement for a direct current power system embodying the invention while Figs. 2, 3 and 4 show modifications thereof.

In Fig. 1 is shown a motor generator set which comprises a pair of dynamo electric machines 1, 2, of the metadyne type. Machine 1 is provided with an armature having a set of primary brushes $a$, $c$, and a set of essentially short circuited secondary brushes $b$, $d$, together with a field winding 8 having one terminal thereof connected to primary brush $a$, and an independently excited field winding 9.

The machine 2, which is coupled to machine 1, comprises a set of essentially short circuited brushes $a$, $c$ and a set of secondary brushes $b$, $d$. A consumer 3 is connected across the brushes $b$, $d$ of machine 2. The secondary brush $b$ of machine 2 is connected to the primary brush $c$ of machine 1. The other terminal of winding 8 and the brush $d$ of machine 2 are connected to terminals $T_1$, $T_2$, respectively. The terminals $T_1$, $T_2$, are adapted to have applied thereto a direct current of constant voltage.

The machine 2 further comprises stator windings 6, 10. The winding 6 is independently excited while the winding 10 is traversed by a current varying rapidly with a change in the speed of the shaft coupling machines 1, 2, from a predetermined speed. To this end there is provided a dynamo electric machine 11 which is coupled to the machines 1, 2, and includes a shunt exciting field winding 12. The winding 10 is connected in series with the armature of machine 11 and is adapted to be energized by a source of direct current at constant voltage. The machine 11, which may be designated as a regulator dynamo, is more fully described in Patent 1,962,030. It will be apparent that the regulator current supplied by the regulator dynamo 11 will modify the value of the current supplied by machine 2 in a manner to keep the speed of the coupled machines constant.

The specific details of construction of machine 1 may be found in application Ser. No. 707,699, filed November 4, 1946, while the machine 2 is described in Patent 2,094,492 and British Patent 420,167.

In machine 1, the stator winding 8 is adapted to create a flux partially compensating the flux created by the current passing through the armature through the primary brushes $a$, $c$. Such an arrangement allows the machine to react rapidly against any quick change in the voltage applied to its primary brushes without dangerous surges of the current traversing the short circuited brushes $b$, $d$, thereof. The field winding 9, supplied with a regulated controlling current, creates a flux substantially in the direction of the armature flux due to the current traversing the short circuited brushes $b$, $d$. The ampere turns of the winding 9 determine the value of the starting torque of the machine 1.

The windings 6, 10 of machine 2 create fluxes substantially in the direction of the armature flux due to the current traversing the armature through the secondary brushes $b$, $d$ and designated as $Isd$. The ampere turns created by the winding 6 are arbitrarily determined and control the direction and intensity of the current $Isd$.

The current traversing the winding 10 and controlled by the regulator dynamo 11, which may be referred to as a regulator current, creates ampere turns which are algebraically added to the ampere turns of the winding 6 and modify the intensity of the current $Isd$ so that the load of machine 2 is limited and the speed of the common shaft is maintained practically constant.

It is apparent that while the input voltage applied to the terminals $T_1$, $T_2$, is constant, the output voltage supplied to the consumer 3 may vary from zero to any value in the neighborhood of the input voltage. Also, the voltage at the primary brushes of machine 1 will vary from the input voltage to zero. It is further apparent that in spite of wide variations in the voltage requirement of the consumer, the load will be kept within safe limits because of the controlling action of the regulator current on machine 2 and the speed of the common shaft will remain substantially constant.

In Fig. 2, the system shown differs from that shown in Fig. 1 in that a dynamo electric machine 21 replaces the machine 1. The machine 21 is of the metadyne type and is more fully described in application Ser. No. 707,698, filed November 4, 1946. Such machine comprises an armature provided with a pair of primary brushes $a$, $c$ and a pair of secondary brushes $b$, $d$, together with stator field windings 13, 29. The winding 29 is independently excited and controls by its ampere turns the starting torque of the machine. The winding 13 is connected across the secondary brushes $b$, $d$ and is traversed by a secondary current which creates a flux opposing and greater than the armature flux due to the secondary current. The consumer 3 is connected across the brushes $b$, $d$ of the machine 2 and the primary brush $c$ of machine 21, in the manner previously described.

The machine 21 is adapted to operate when the primary brushes thereof, $a$, $c$, are inserted in a loop carrying constant current applied to terminals $T_1$, $T_2$. The current traversing the consumer 3 generally differs substantially from the current supplied to the terminals $T_1$, $T_2$, and its value is originally determined by the ampere turns created by the winding 6 of machine 2. The regulator current traversing winding 10 will automatically moderate the current supplied to consumer 3 and will keep the load within safe limits and the speed of the common shaft practically constant.

In Fig. 3 is shown a system embodying the invention and including a dynamo electric machine 31 of the metadyne type which is more fully described in application Ser. No. 698,372, filed September 20, 1946. The machine 31 comprises an armature provided with a pair of primary brushes $a$, $c$ and a pair of substantially short circuited, secondary brushes $b$, $d$. The machine further includes a stator field winding 39 and a stator field winding 40. A dynamo electric machine 32 and a regulator dynamo 11 are coupled to machine 31 by a common shaft. The machine 32 is similar to machine 2, previously described, except that the field winding 10 has been omitted.

The winding 40 of machine 31 is connected in series with the armature of the regulator dynamo 11 and is traversed by the regulator current. The ampere turns created by the winding 40 control the current absorbed by the machine 31. Control winding 39 is independently excited and its ampere turns determine the starting torque of machine 31. The input current of constant voltage is applied to terminals $T_1$, $T_2$, which form a part of the circuit including the primary brushes $a$, $c$ of the machine 31. The brushes $b$, $d$ of the machine 32 are connected across the consumer 3, in the manner previously described.

The value of the ampere turns of the winding 6 of the machine 32, determines the intensity of the current which traverses the consumer 3. The regulator current traversing the field winding 40 of machine 31 determines the current absorbed by the machine 31 in accordance with the load. Therefore, while in the previous examples shown in Figs. 1, 2, the regulator current controlled the output of machine 2, which generally operates as a generator; in the example shown in Fig. 3, the regulator current controls the input of machine 31, keeping the speed of the common shaft practically constant.

It is understood that the machine 32 may be provided with a second field winding similar to the winding 10 of machine 2, as shown in Fig. 2, and connected in series with the armature of regulator dynamo 11, so as to limit the output supplied by machine 32.

The system shown in Fig. 4 is similar to that of Fig. 3, except that the machine 32 is replaced by a dynamo electric machine 42 of the generator metadyne type. Such a machine is more fully described in application Ser. No. 701,793, filed October 7, 1946, now patent No. 2,498,765. The machine 42 includes an armature provided with a pair of primary brushes $a$, $c$ and a pair of secondary brushes $b$, $d$, together with a pair of independently excited field windings 14, 46. The secondary brushes $b$, $d$ are connected across a consumer 3, as previously described. The primary brushes $a$, $c$ are connected across another consumer 15 which may take the form of a storage battery to be charged.

The ampere turns of winding 14 determine the current supplied by the machine to the consumer 15. The ampere turns of winding 46 determine the current supplied to the consumer 3.

Here again, as in the case of the system shown in Fig. 3, the action of the regulator current upon the machine 31 causes it to absorb a current corresponding to the load of the consumers 3, 15, independently of the value of said load and of the voltage applied to terminals $T_1$, $T_2$. Further the speed of the common shaft is kept practically constant.

It is apparent that in all of the examples hereinabove described, the consumer 3 is traversed by the sum of the secondary current delivered by the machines 2, 32 or 42 and the current supplied to the terminals $T_1$, $T_2$. Therefore, the power transformed by the interconnected dynamo electric machines (1, 2; 21, 2; 31, 32; 31, 42) is only a part of the power absorbed by the consumers.

Since the embodiments of the invention above described, may be modified, it is to be understood the matter set forth above and shown in the drawings is to be interpreted as illustrative and not in a limiting sense.

What I claim is:

1. A power system comprising a pair of dynamo electric machines, each of said machines including an armature provided with a pair of primary brushes and a pair of secondary brushes, and at least one field winding, said machines being mechanically coupled for simultaneous rotation, a circuit including the primary brushes of one of said machines for receiving an input current, the secondary brushes of said last mentioned machine forming a closed circuit, a consumer connected across the secondary brushes of the other of said machines and in series with the primary brushes of the first mentioned machine, whereby said consumer is traversed by said input current and by the secondary current of said second mentioned machine and dynamo electric means coupled to said machines for creating a control current varying rapidly with changes in the rotational speed of said machines, a circuit comprising at least one of the field windings of at least one of said machines adapted to be traversed by said control current whereby the rotation of said machines is maintained at substantially constant speed independently of the load of said consumer.

2. A system as set forth in claim 1 wherein the one field winding is connected in series with the primary brushes of the machine associated therewith and another field winding of said first mentioned machine is adapted to create a flux in the direction of the armature flux created by the secondary current traversing the secondary brushes of said first mentioned machine.

3. A system as set forth in claim 1 wherein said first mentioned machine comprises a pair of field windings for creating a flux in the same path as the armature flux due to the secondary current passing through the secondary brushes of said first mentioned machine, one of said last mentioned windings being adapted to be independently excited, the other of said last mentioned windings being connected in series with the secondary brushes of said first mentioned machine for creating a flux opposite in direction to said armature flux.

4. A system as set forth in claim 1, wherein said first mentioned machine comprises a pair of field windings, one of said last mentioned windings being adapted to be independently excited for creating a flux in the same direction as the armature flux due to the secondary current passing through the secondary brushes of said first mentioned machine, the other of said last mentioned windings being adapted to be traversed by said control current.

5. A system as set forth in claim 1, wherein the primary brushes of said second mentioned machine are substantially short circuited, said second mentioned machine including a pair of field windings for creating a flux in the path of the armature flux due to secondary current passing through the secondary brushes of said second mentioned machine, one of said last mentioned windings being adapted to be independently excited and the other of said last mentioned windings being adapted to be traversed by said control current.

6. A system as set forth in claim 1, wherein the primary brushes of said second mentioned machine are substantially short circuited, said second mentioned machine including a field winding adapted to be independently excited for creating a flux in the path of the armature flux due to the secondary current passing through the secondary brushes of said second mentioned machine.

7. A system as set forth in claim 1, wherein said second mentioned machine includes a pair of independently excited windings, a second consumer connected across the primary brushes of said second mentioned machine, one of said last mentioned windings being adapted to control the current supplied to one of said consumers and the other of said last mentioned windings being adapted to control the current supplied to the other of said consumers.

JOSEPH MAXIMUS PESTARINI.

REFERENCES CITED

The following references are of record in the file of this patent:

UNITED STATES PATENTS

| Number | Name | Date |
|---|---|---|
| 996,894 | Stull | July 4, 1911 |

FOREIGN PATENTS

| Number | Country | Date |
|---|---|---|
| 331,158 | France | July 20, 1903 |